Jan. 26, 1926.
J. FURLER
1,570,737
HAY LOADER COUPLER
Filed Dec. 17, 1924
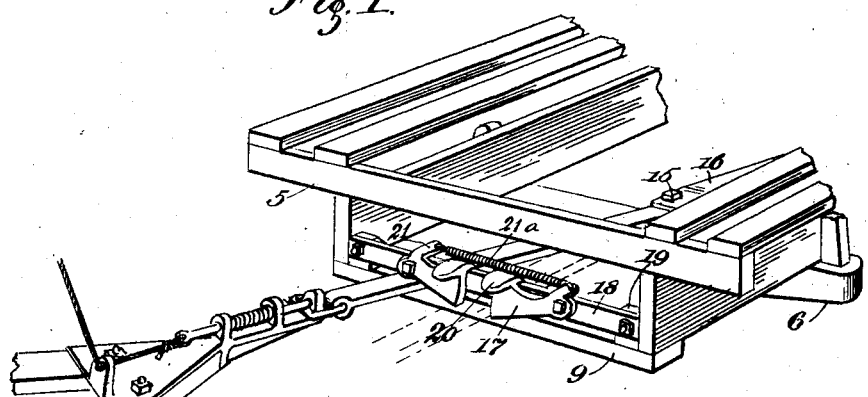
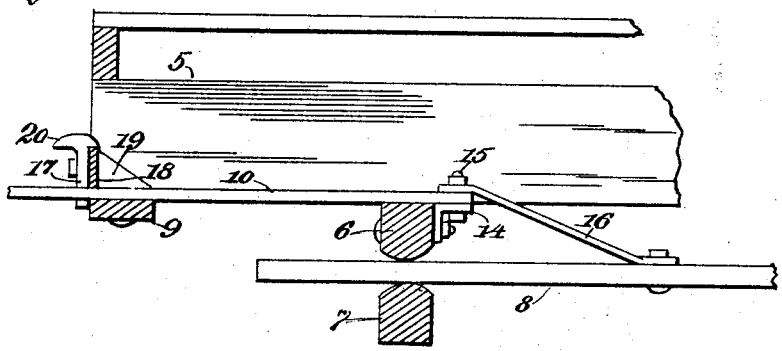
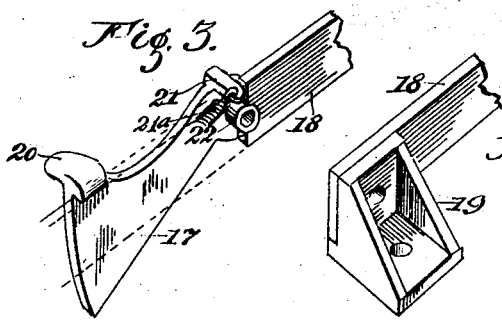
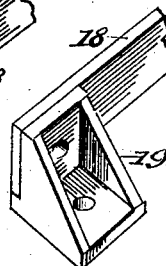
Inventor
John Furler
By J. M. St. John
Attorney Patented Jan. 26, 1926.

1,570,737

UNITED STATES PATENT OFFICE.

JOHN FURLER, OF WILLIAMSBURG, IOWA.

HAY-LOADER COUPLER.

Application filed December 17, 1924. Serial No. 756,528.

*To all whom it may concern:*

Be it known that I, JOHN FURLER, a citizen of the United States, residing at Williamsburg, in the county of Iowa and State of Iowa, have invented certain new and useful Improvements in Hay-Loader Couplers, of which the following is a specification.

This invention relates to hay-loaders, and the object of the invention is to make it easy to couple a farm wagon thereto.

In the use of hay-loaders, with the present facilities for coupling them to wagons, it is often a tedious and vexatious operation to make the coupling. The hay-loader is so heavy that it is impossible to shift its position on the ground by hand, and as the wagon must be backed up to it the backing must be done quite exactly, since the coupling parts are central to the hay-loader and the rear of the wagon, and are limited to a narrow space laterally. In practice it is not uncommon for the driver to make half a dozen futile attempts to back the wagon to the right spot, before he finds the right place for the coupling to be made. This invention aims to eliminate this difficulty by providing a laterally swinging coupling device whereby the coupling may be made though the hay-loader and wagon are quite widely out of alignment.

The invention is fully illustrated and described in the following specifications and claims, taken in connection with the accompanying drawing, in which:—

Fig. 1 is a rear view in perspective of my improved coupling apparatus as applied to the rear of a hay-wagon and the tongue of a hay-loader. Fig. 2 is a central longitudinal section showing the attachment of the parts to a wagon. Fig. 3 shows details of the draw-bar latch in perspective. Fig. 4 shows in the same manner details of the cross-bar carrying the latches, and the attachment of the bar to the hay-rack.

In the drawing, the numeral 5 denotes a hay-rack for a farm wagon, of which only the rear bolster 6, axle 7 and reach 8 are shown. The rack has a lower cross-bar 9 at the rear end, which serves as a support for a draw-bar 10, provided at the rear end with a ring 11, or the like, for attachment to the hook 12 at the front end of the hay-loader tongue 13. The front end of the draw-bar has a pivotal connection with the rear bolster of the wagon, preferably by a bracket 14 bolted to the front of the bolster, and carrying a pivot-bolt 15. The twisting strain this would cause to the bolster is prevented by passing the pivot-bolt through a "hammerstrap" 16, bolted at its front end to the reach. This construction allows the draw-bar to be swung widely sidewise, so as to connect easily with a hay-loader tongue, which may be far from the central line of draft indicated by the dotted outline of the draw-bar.

When in operative position the draw-bar should be held rigidly in alignment, to prevent any swaying of the hay-loader sidewise, which would of course affect its proper operation in loading. Provision is accordingly made for latching the draw-bar in the central position. The device consists of a pair of gravity dogs 17 pivoted to a cross-bar 18 set above the draw-bar. The ends of the cross-bar connect with brackets 19 bolted to the rack cross-bar, as shown. This cross-bar and the one below prevent undue vibration of the draw-bar up and down. The dogs are provided with thumb-pieces 20, by which they are lifted, and lugs 21 serve to hold the dogs in operative position, by a connecting spring 21$^a$. In practice the pivotal part of the dog is a boss 22, slightly longer than the thickness of the cross-bar, and loosely fitting in a hole in the bar. A bolt and nut held tightly in the hub allow the dog to turn freely.

With one man to manage the team and another (who forms the load) to do the coupling, the proper connection is made very easily and quickly. The wagon is backed the proper distance for coupling, and approximately in alignment with the hay-loader. The man on the ground, or at the rear of the hay-rack, then lifts one of the dogs and swings the draw-bar to connect with the hay-loader tongue. As the wagon moves forward the parts straighten out, and when the draw-bar reaches the central position the dog drops, and it is then securely locked in working position.

Having thus described my invention, I claim:

1. A hay-loader coupling, comprising, in combination with a wagon and its rack, a draw-bar pivotally connecting with the wagon and extending to the rear of the rack, brackets attached to the rack at the rear, a connecting cross-bar, and a pair of dogs pivoted to the cross-bar, and adapted to hold the draw-bar between them in a central position.

2. A hay-loader coupling, comprising, in combination with a wagon and its rack, a lower crossbar connecting the sides of the rack at the rear, brackets attached thereto, a connecting cross-bar spaced away from the lower cross-bar, an interposed draw-bar connecting pivotally at its front end with the wagon, a pair of dogs pivoted to the upper cross-bar, and adapted when depressed to hold the draw-bar in a central position, and a spring connecting said dogs to pull them to the depressed position.

In testimony whereof I affix my signature.

JOHN FURLER.